United States Patent [19]
Ying-Kuan

[11] Patent Number: 5,365,879
[45] Date of Patent: Nov. 22, 1994

[54] ANIMAL OPERATED FEEDING APPARATUS

[76] Inventor: Ho Ying-Kuan, No. 22, Alley 18, Lane 75, An Ping Road, Tainan, Taiwan, Prov. of China

[21] Appl. No.: 215,537
[22] Filed: Mar. 22, 1994
[51] Int. Cl.$^5$ .............................................. A01K 5/00
[52] U.S. Cl. ........................................ 119/54; 119/18
[58] Field of Search ................... 119/54, 53.5, 75, 77, 119/51.5, 55, 76, 18; 222/322, 408.5, 501, 248

[56] References Cited

U.S. PATENT DOCUMENTS

| | | | |
|---|---|---|---|
| 738,938 | 9/1903 | Pumphrey | 119/54 |
| 1,210,693 | 1/1917 | Rassmann | 119/75 |
| 1,343,817 | 6/1920 | Gilbert | 119/55 |
| 2,944,517 | 7/1960 | Siggins | 119/55 |
| 4,134,365 | 1/1979 | Futers et al. | 119/77 |

Primary Examiner—Todd E. Manahan
Attorney, Agent, or Firm—Pro-Techtor International

[57] ABSTRACT

A feeding device includes a tray, a chute secured to the tray and communicating with the tray opening, a bottle engaged on the chute for receiving food, and an actuator engaged in the chute for moving the food into the tray. The actuator includes a board pivotally supported in the chute, and a panel formed in the lower portion of the board and engaged in the tray. The food is moved into the tray through the chute by the board when the panel is depressed. A base is engaged below the tray for supporting the tray and the bottle in place.

4 Claims, 8 Drawing Sheets

ANIMAL OPERATED FEEDING APPARATUS

BACKGROUND OF THE INVENTION

1. Field of the Invention

The present invention relates to a feeding apparatus, and more particularly to an animal feeding apparatus for delivering a suitable quantity of food.

2. Description of the Prior Art

Typical animal feeding apparatus comprise a standardized feeding cycle, such as one feeding per day at a given time, however, most of the feeding apparatus comprise an electric system to measure the quantity of the food and to deliver the food at a predetermined time interval. The electric system is expensive and is apt to be out of order.

The present invention has arisen to mitigate and/or obviate the afore-described disadvantages of the conventional animal feeding apparatus.

SUMMARY OF THE INVENTION

The primary objective of the present invention is to provide an animal feeding apparatus which will automatically release food into a tray when a pet is caring the food contained in the tray.

in accordance with one aspect of the invention, there is provided a feeding apparatus comprising: a tray including a bottom portion having a depression formed therein, a side portion having an opening formed therein, a chute secured to the tray and communicating with the opening; a board pivotally supported in the chute and including an upper portion extended outward of the chute and a lower portion extended inward of the tray, a panel formed in the lower portion of the board and engaged in the depression of the tray, means for biasing the panel away from the depressions a guide including a channel engaged in the chute and including an upper portion; and a bottle for accommodating food including a lower portion engaged with the upper portion of the guide, the food moving into the tray via the chute and the opening. The food is moved by the board when the panel is depressed.

The tray includes a pair of tracks for engaging with a door so as to adjust the size of the opening. The board includes a projection extended therefrom for engaging with the food. A base is engaged below the tray for supporting the tray and the bottle in place.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 4:
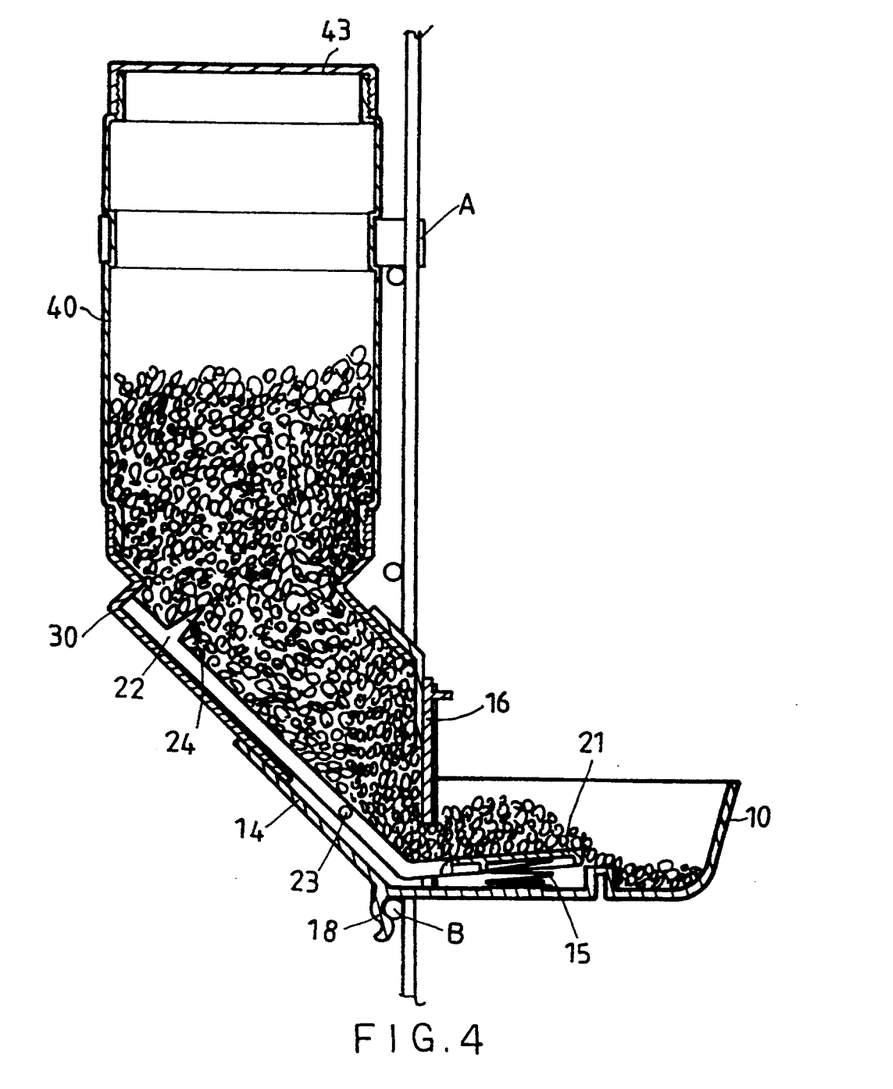
FIGS. 4 and 5 are cross sectional views illustrating the operation of the feeding apparatus.

Referring to the drawings, and initially to FIGS. 1, 2, 3A, 3B and 4, an animal feeding apparatus in accordance with the present invention is generally designated with the reference numeral 1 and comprises a tray 10 including a depression 11 formed therein, two openings 111 formed in the bottom portion of the depression 11, a bulge 112 formed on the depression 11 for engaging with a spring 15, a chute 14 secured to the tray and communicating with the tray at an entrance 12, two holes 141 formed in the chute 14, a pair of tracks 121 disposed beside the entrance 12 for engaging with a door 16 which may enclose the entrance 12, two oblong holes 13 formed beside the tracks 121 for engaging with bolts 171 and nuts 172 so as to secure the tray 10 to the pet house, each of the bolts 171 including a slot 173 formed therein for engaging with wire elements A of the pet house, two lumps 174 formed in the slot 173, and a retaining member 18 formed in the bottom portion of the tray 10 for engaging with wire element B of the pet house (FIG. 4).

Figure 1:
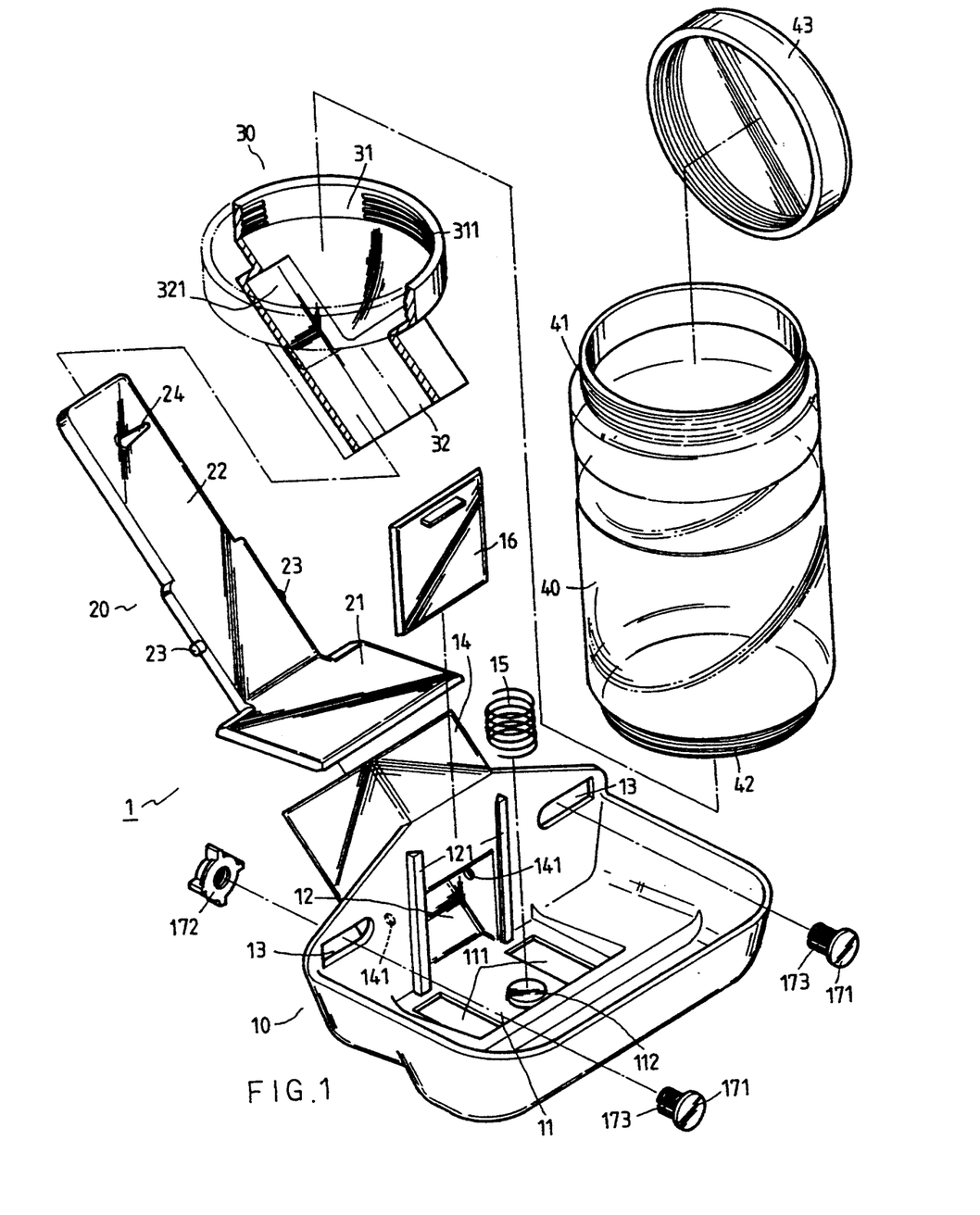
FIG. 1 is an exploded view of an animal feeding apparatus in accordance with the present invention
Figure 2:
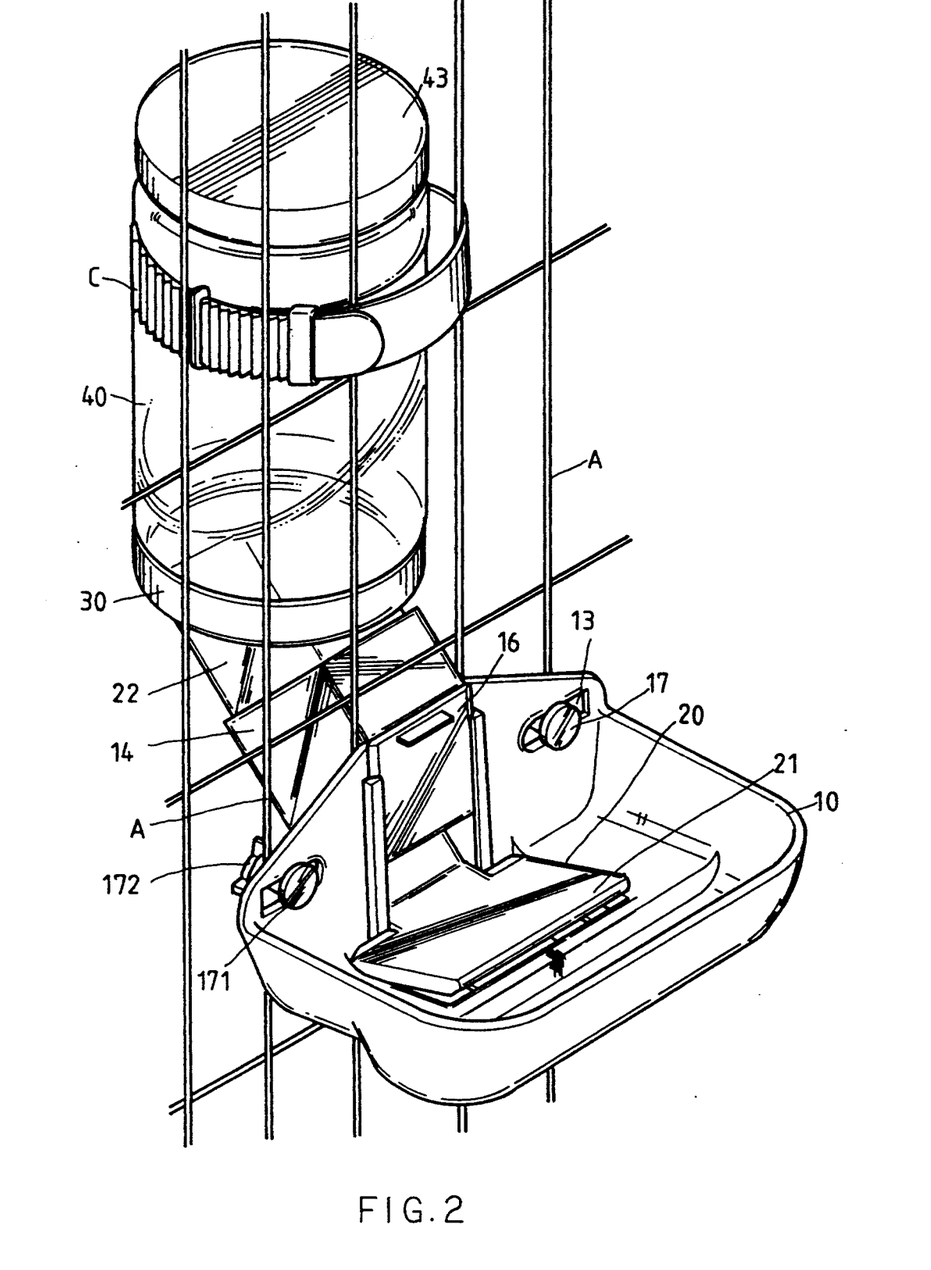
FIG. 2 is a perspective view of the animal feeding apparatus.
Figure 3A:
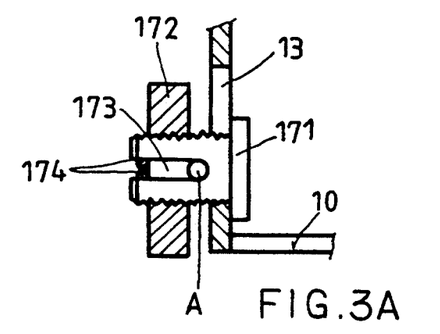
FIG. 3A is a partial cross sectional view illustrating the elements for fastening the tray to the housing.
Figure 3B:
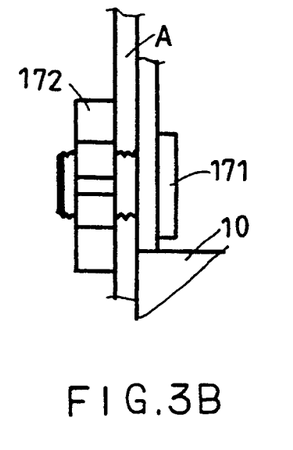
FIG. 3B is a schematic view illustrating the elements for fastening the tray to the housing.
Figure 5:
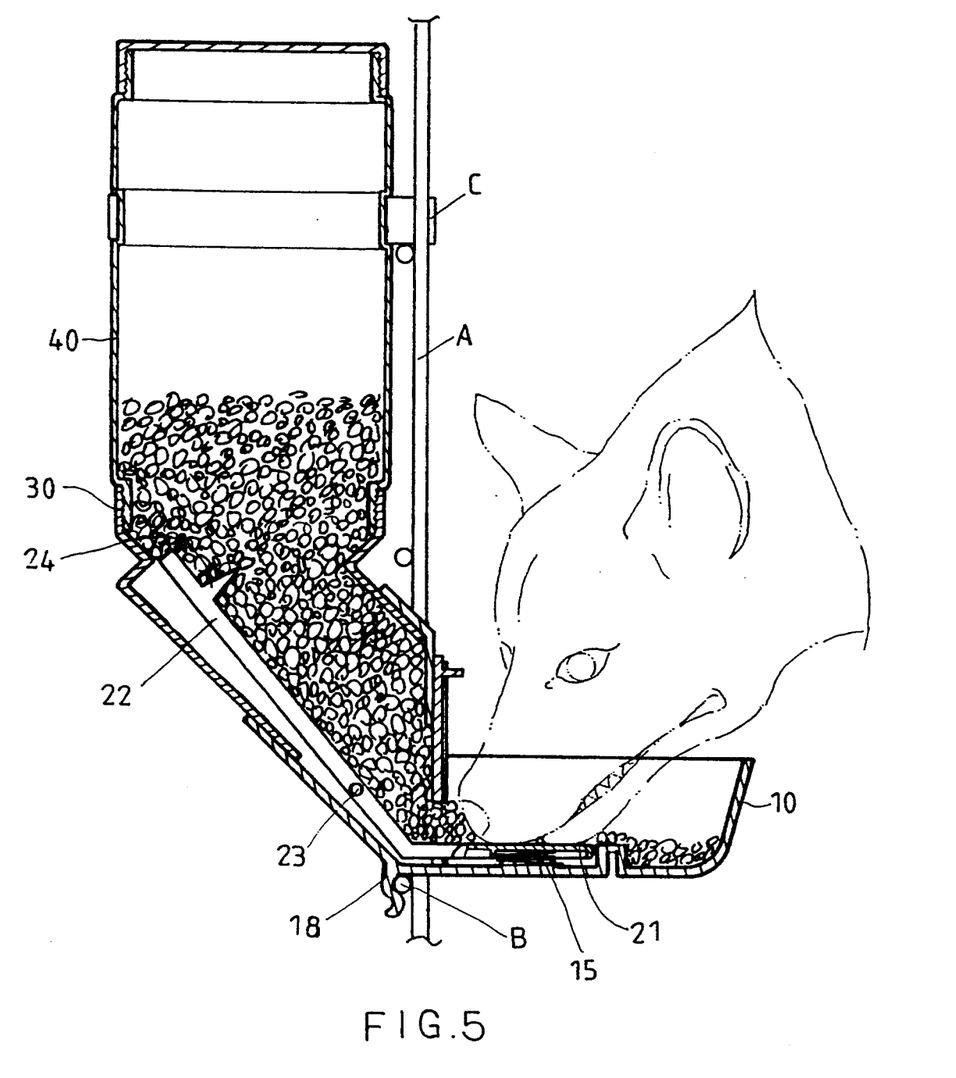
Figure 6:
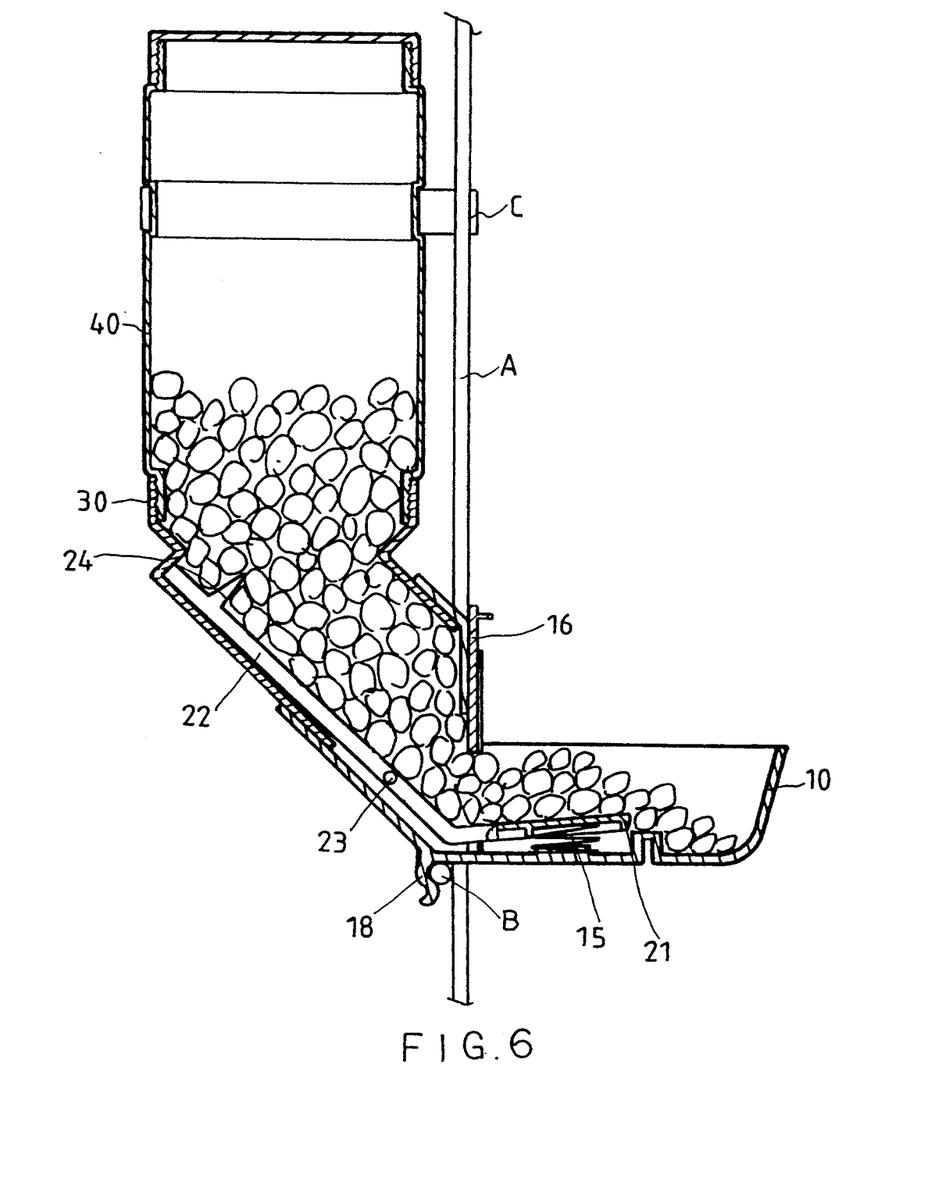
FIG. 6 is a cross sectional view similar To FIGS. 4 and 5, illustrating different food contained in the tray.

An actuator 20 includes a board 22 having two stubs 23 extended laterally thereon for engaging with the holes 141 of the chute 14 such that the board 22 is rotatable about the stubs 23, a panel 21 engaged in the depression 11 of the tray 10 and enraged with the spring 15, a projection 24 extended from the board 22. A guide 30 includes a ring 31 having an inner thread 311 formed therein, and a channel 32 engaged in the chute 14 and having a recess 321 formed therein for engaging with the board 22. A container or a bottle 40 for accommodating food therein includes an outer thread 42 formed in the bottom portion for engaging with the inner thread 311 of the guide 30 and an outer thread 41 formed in the upper portion for engaging with a cap 43, the bottle 40 may be secured to the pet house A with a clamping belt C.

in operation, as shown in FIG. 5, when the pet eats the food contained in the tray 10, the panel 21 will be depressed by the pet, at this moment, the food contained in the chute 14 will be actuated by the board 22 and the projection 24 and may flow into the tray via the entrance 12. The food enters the depression 11 may move out of the tray 10 via the openings 111. It is preferable that the door 16 is force-fitted between the tracks 121 such that the door 16 may be adjusted relative to the tracks 121 for adjusting the size of the opening 12 which is determined by the size of the food accommodated in the bottle 40 (FIGS. 5 and 6).

Figure 7:
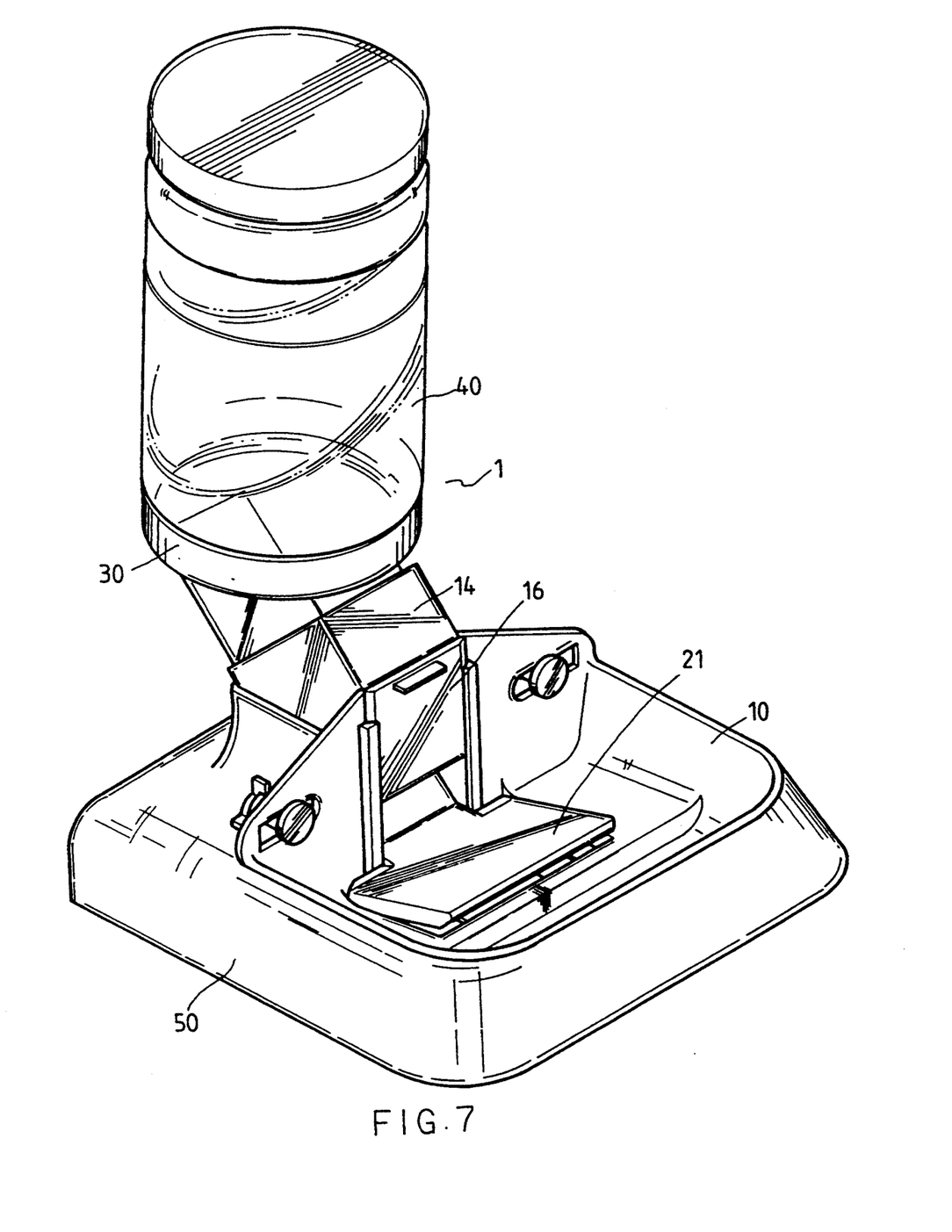
FIG. 7 is a perspective view illustrating another application of the feeding apparatus.
Figure 8:
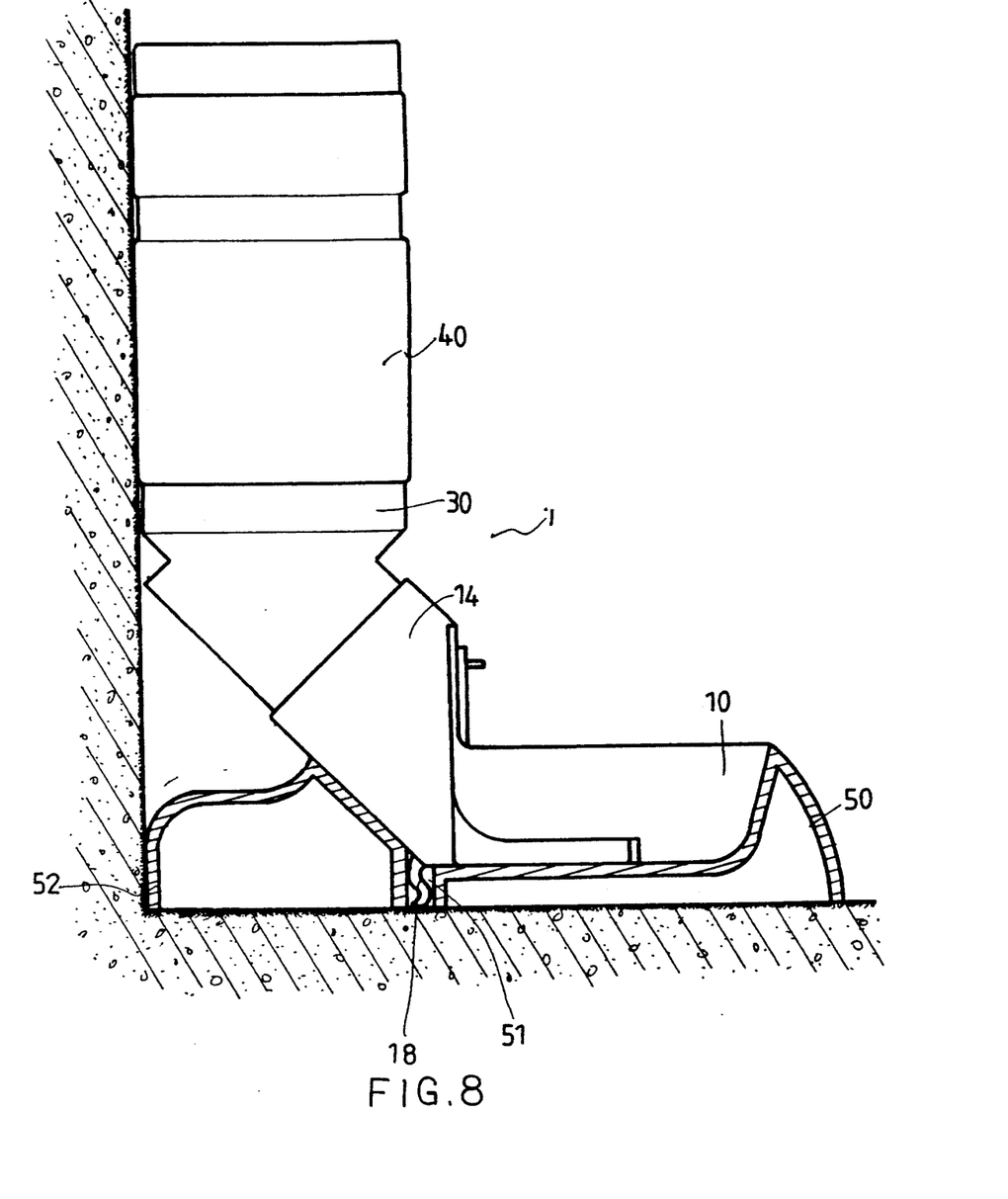
FIG. 8 is a cross sectional view of the feeding apparatus as shown in FIG. 7.

Referring next to FIGS. 7 and 8, the tray 10 may be engaged in an upper portion of a base 50, the retaining member 18 may be received in a groove 51 of the base 50, and the tray 10 includes a support 52 for enlarge the size of the base and for supporting the whole animal feeding apparatus.

Accordingly, the animal feeding apparatus in accordance with the present invention may automatically release food into the tray when the pet is eating the food contained in the tray.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A feeding apparatus comprising:

a tray including a bottom portion having a depression formed therein, a side portion having an opening formed therein, a chute secured to said tray and communicating with said opening;

a board pivotally supported in said chute and including an upper portion extended outward of said chute and a lower portion extended inward of said tray, a panel formed in said lower portion of said board and engaged in said depression of said tray, means for biasing said panel away from said depression;

a guide including a channel engaged in said chute and including an upper portion; and a bottle for accommodating food including a lower portion engaged with said upper portion of said guide, said food moving into said tray via said chute and said opening;

said food being moved by said board when said panel is depressed.

2. A feeding apparatus according to claim 1, wherein said side portion of said tray includes a pair of tracks provided therein, and a door engaged between said tracks for adjusting open sizes of said opening.

3. A feeding apparatus according to claim 1, wherein said board includes a projection extended therefrom for engaging with said food.

4. A feeding apparatus according to claim 1 further comprising a base engaged below said tray for supporting said tray and said bottle in place.

* * * * *